Aug. 11, 1942.    H. R. FORNEY    2,292,751
TRAILER HITCH
Filed Aug. 7, 1941
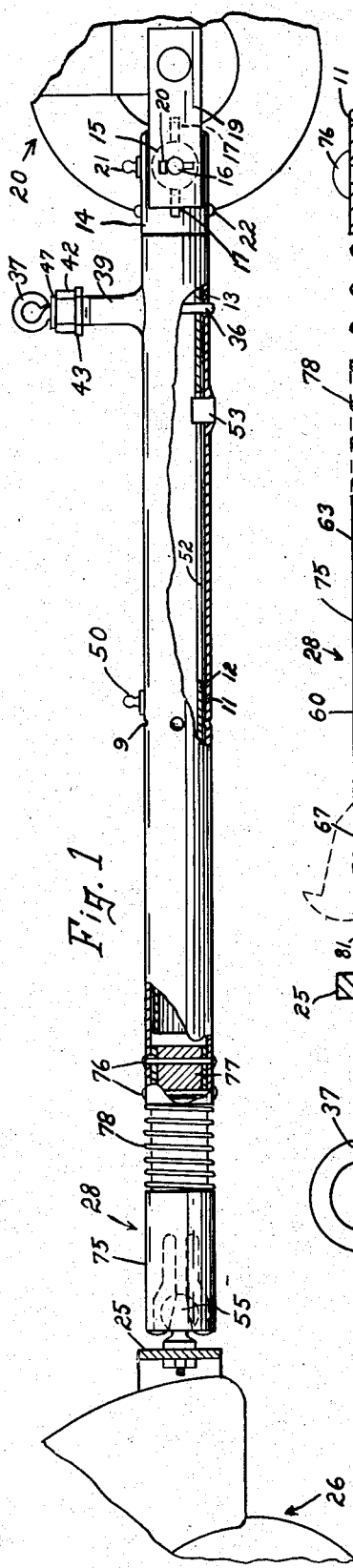
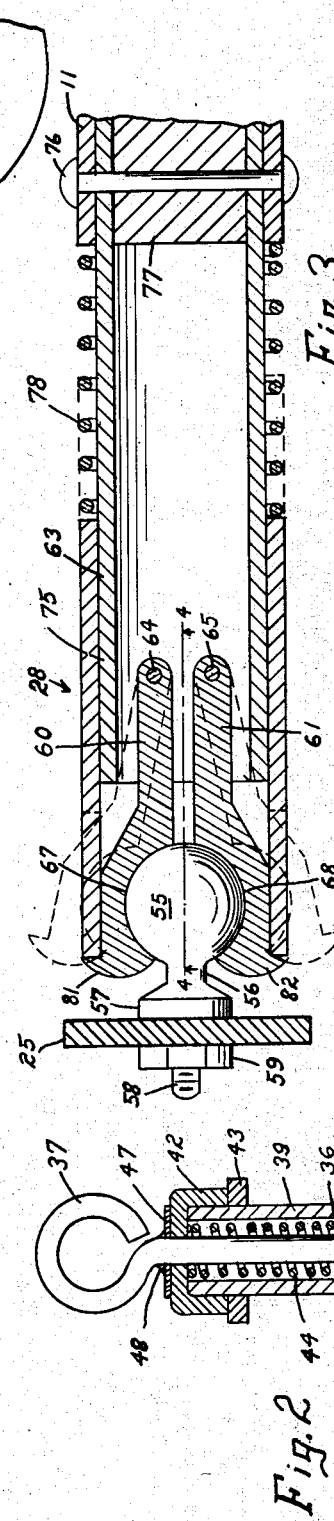
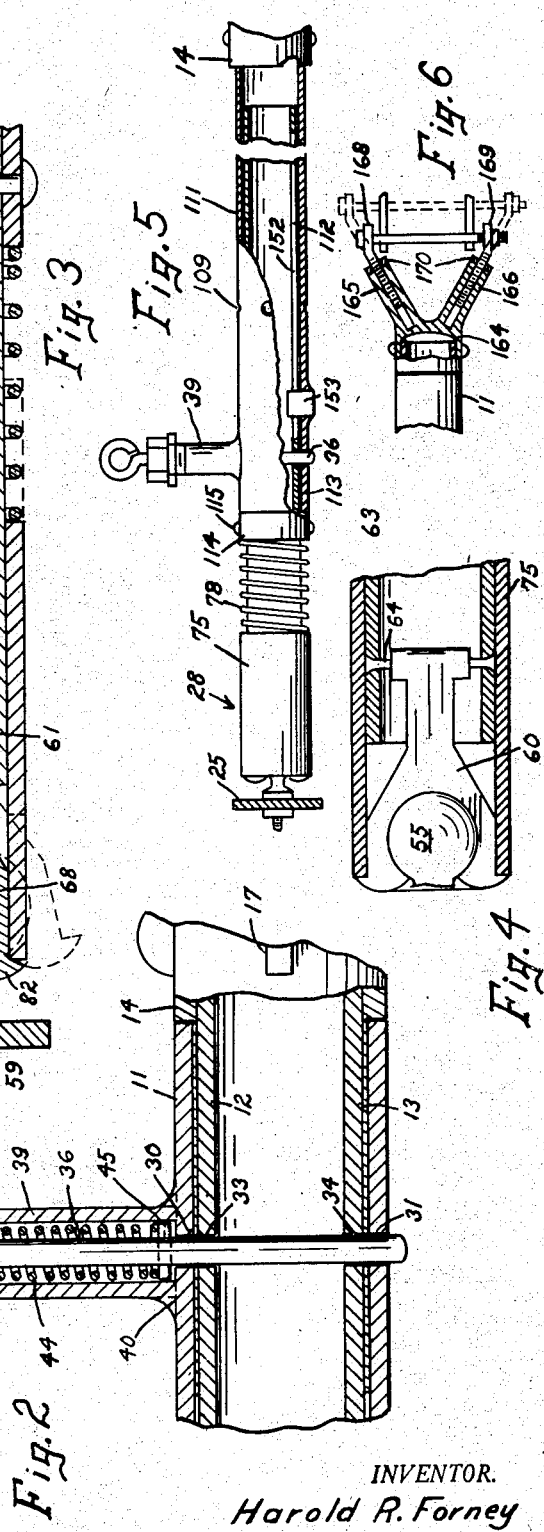
INVENTOR.
Harold R. Forney
BY Frederick E. Lange
ATTORNEY Patented Aug. 11, 1942

2,292,751

UNITED STATES PATENT OFFICE 2,292,751

TRAILER HITCH

Harold R. Forney, Surprise, Nebr.

Application August 7, 1941, Serial No. 405,810

6 Claims. (Cl. 280—33.14)

The present invention is concerned with a new and improved trailer hitch and more particularly one of the type in which there are telescoping members which are locked in fixed relation when the trailer is drawn by the vehicle.

It is the customary practice to employ some sort of coupling means between a motor vehicle and a trailer or other drawn vehicle in which provision is made for initially coupling the two vehicles and and thereafter adjusting the coupling means to maintain the desired spacing between the vehicles. It is quite common to use for this purpose, two telescoping members. Such an arrangement has the advantage of providing a relatively compact construction which is more easily manipulated. In prior trailer hitches of this type, however, the process of actually coupling the trailer to the motor driven vehicle was unduly complicated. In some cases, more than one fastening means was employed between the two telescoping members so that a plurality of fastening operations were necessary, each being accompanied by a certain amount of adjustment of the relative position of the two vehicles. In some cases an excessive amount of manipulation of the motor driven vehicle or the trailer was necessary. Since these trailers are often coupled while loaded, it is almost impossible to manipulate the trailer by hand so that it becomes necessary to adjust the position of the motor driven vehicle. Furthermore, almost all of the prior devices of this type have been characterized by the absence of means for preventing dust entering between the telescoping members. It will be quite obvious that where the trailer is used in agricultural communities or on gravel roads, these trailers operate in an almost constant cloud of dust raised by the motor driven vehicle ahead. The result is that the majority of the hitches of the type using telescoping members soon acquire so much dust between the members that relative movement of the members becomes very difficult. This further adds to the difficulty of the coupling operation.

An object of the present invention is to provide a trailer hitch of the type using telescoping members wherein provision is made for protecting the coupling against the access of dust and other foreign matter.

A further object of the present invention is to provide such a trailer hitch construction in which the two telescoping members are normally locked in a position in which an end of one of the members engages a shoulder on the other member.

A further object of the invention is to provide a coupling means of the type described in which provision is made for sealing the locking means against all access of dust thereto.

A further object of the invention is to provide such a trailer hitch in which a pair of spaced guides are employed between the inner and outer members with means for introducing lubricant between said guides.

A further object of the invention is to provide a coupling means of the type described in which provision is made for quickly attaching and detaching the trailer hitch from the motor driven vehicle.

A further object of the invention is to provide an adjustable means for coupling the hitch to a trailer.

Other objects of the present invention will be apparent from the consideration of the accompanying specification, claims, and drawing, of which:

Figure 1 is an elevational view, with portions in section, of my improved trailer hitch;

Figure 2 is a vertical sectional view of the locking means employed in locking the two telescoping members together;

Figure 3 is a vertical sectional view of the novel means for coupling the hitch to the motor driven vehicle;

Figure 4 is a top plan view, partly in section, of a portion of the coupling means shown in Figure 3;

Figure 5 is a longitudinal elevational view with portions broken away of a modified form of the trailer hitch, and Figure 6 is a top plan view of a modified form of means for connecting the hitch to the trailer.

Referring specifically to the drawing, the trailer hitch generally comprises an outer cylindrical pipe 11 and an inner pipe 12, the two pipes being in telescoping relation. The outer diameter of the inner pipe 12 is slightly less than that of pipe 11 so as to permit pipe 12 to slide freely within pipe 11. Rattling is prevented by a guide collar 13 secured within the right hand end of pipe 11 and snugly engaging pipe 12 (as best shown in Figure 2) and a plurality of inwardly directed projections 9 extending from the inner surface of pipe 11 and snugly engaging pipe 12. The outer section 11, in the modification shown in Figure 1, is the one which is connected to the motor driven vehicle and the inner section 12 is connected to the trailer.

A coupling member 14 is secured over the right hand end of the pipe 12 by a rivet 22 or other suitable fastening means. This coupling member is in the form of a closed cap having a hub portion 15 and an aperture 16 extending through this hub portion. Reinforcing ribbing 17 is provided to strengthen the hub portion 15. A yoke 19 secured to the axle of a trailer 20 is secured to the coupling 14 by means of a pin extending through the apertures 16 and held in position by a locking pin 20. It will be understood that the connection of the trailer with coupler 14 is more permanent although, of course, the coupling member 14 can be removed when desired. A grease nipple 21 is provided to lubricate the pin extending through aperture 16. In the form shown in Figure 1, it will be noted that the coupling 14 has substantially the same external diameter as the outer member 11 so that when member 11 is in engagement therewith, a relatively smooth outer surface is provided at the joint.

Coupling member 11 is connected by connecting means 28, to be described later, to the bumper 25 of a motor driven vehicle 26. The coupling means 28 is of such nature as to be quickly detachable and attachable and to permit free angular movement between the connected members to a limited extent.

Referring to Figure 2, it will be noted that a pair of apertures 30 and 31 extend through the outer pipe 11. A corresponding pair of apertures 33 and 34 extend through the inner pipe 12. When the outer pipe 11 is in engagement with the shoulder of coupling member 14, the apertures 30 and 31 are aligned with the apertures 33 and 34 to receive a coupling pin 36. This coupling pin is in the form of a straight rod which is bent at its upper end to form an eye 37 for withdrawing the pin from the apertures 31, 33, and 34 in order to permit uncoupling of the members 11 and 12.

While it is old to employ coupling pins between two interfitting members, I employ a novel means for preventing the access of dust to the telescoping surfaces of the two members. Surrounding the intermediate portion of the coupling pin 36 is a sleeve 39, the lower end of which is welded, as at 40, to the outer pipe 11. The sleeve 39 is secured to pipe 11 coaxially of apertures 30 and 31. The upper end of sleeve 39 is threaded to receive a screw threaded cap member 42. A lock nut 43 is provided to lock the cap member 42 in position. A spring 44 is interposed between the cap member 42 and a pin 45 extending through the coupling pin 36. It will be obvious that this spring 44 biases the coupling pin 36 downwardly into the apertures 30 to 34. The pin is withdrawn from the apertures by pulling on the eye 37. The spring permits the pin 36 to be withdrawn until it clears the opening 33. The amount of movement permitted by spring 44 can be adjusted by adjusting the position of cap 42. The lock nut 43 serves to hold the cap 42 in the adjusted position. When pin 36 has been withdrawn, to clear the outer opening 33, it will be obvious that the two members 11 and 12 can be moved apart.

Limiting the biasing action of spring 44 and acting as a sealing means is a circular disk 47 which is rigidly secured, as at 48, by welding or some similar method to the coupling pin 36. When the coupling pin is in its normal operative position as shown in Figure 2, the spring 44 urges the disk 47 firmly down into engagement with the top of the screw threaded cap 42. The disk 47 not only serves to limit the downward movement of the coupling pin 36 but also serves effectively to seal the housing formed by sleeve 39 and cap 42 against the access of dust and other foreign material. This insures that spring 44 will always be permitted to move freely and that no dust can get between the telescoping surfaces 11 and 12 to hinder their relative movement.

The sleeve 13 further serves to insure against the entrance of dust. As was previously pointed out, the members are locked in position when the right hand end of the outer pipe 11 is in engagement with the coupling 14. By providing an inner sleeve 13 which snugly engages pipe 12 and is sealed to pipe 11, the entrance of dust between pipes 11 and 12 is further hindered. A grease nipple 50 is located between the guides 9 and 13 and serves for the introduction of grease into the pocket between the telescoping members. By providing an outer member of slightly larger diameter than the inner member, the two members being separated except by guides 9 and 13, and by providing means for introducing grease between the guides, a very free movement between members 11 and 12 results. The fact that no dust is able to enter between these two members further insures the continuance of this free movement for a substantial period of time.

In order to prevent relative rotation and limit the movement apart of the two members 11 and 12, a slot 52 is provided in the inner member 12. Welded to the outer pipe 11 and projecting from the inner surface thereof is a lug 53 of rectangular cross section. This lug 53 is of approximately the same width as the slot 52 and is freely slidable therein. Prior to assembly of the hitch, the outer member 11 is provided with a slot at the desired location of lug 53, this slot being of the same size and configuration as lug 53. The two members 11 and 12 are then assembled and adjusted until the slot in outer member 11 is adjacent slot 52. Lug 53 is then inserted in the slot of member 11 so as to project in slot 52 and is welded to member 11 as shown. By placing the slot 52 in the inner pipe 12 and by providing the lug 53 which projects from the inner surface of pipe 11, the guiding action between pipes 11 and 12 is accomplished without providing an aperture through the pipes by which dust can pass from the outside in between the two telescoping surfaces thereof.

The connecting means 28 will now be described. Secured to the bumper 25 is a spherical knob 55. This knob is connected by a neck portion 56 and a shoulder portion 57 to a screw threaded shank portion 58 which extends through an aperture in the bumper bar 25. This knob is held in place by a nut 59 threaded on the shank portion 58. A pair of arms 60 and 61 are pivotally secured to the pipe 63 by means of pivot pins 64 and 65. As best indicated in Figure 4, in connection with pin 64, pins 64 and 65 are firmly secured within the inner pipe 63 and extend transversely therethrough. The arms 60 and 61 are provided with concave substantially hemispherical faces 67 and 68. The two members 60 and 61 may be formed by turning them out as a single unit and then cutting through the center to provide the two members. When this method is followed, it is necessary to round the two ends on the right hand side of the pivot pin 64 to permit free relative movement of the two arms. The forwardmost outer portion of the arms 60 and 61 has a cylindrical surface so that the two arms together define a substantial portion of a cylinder of an external diameter equal to the internal diameter of a slidable cylindrical sleeve 65. The pipe 63 is connected by rivets 76 to the outer telescoping member 11. A block of wood or some suitable material of the same internal diameter as pipe 63 is interposed in the inner end of the pipe 63 as indicated in 77. This block of material is to prevent any dirt from entering in this space in the inner pipe. Interposed between the outer pipe 11 and the sleeve 75 is a coil spring 78. This spring biases sleeve 75 to the left into a position where it surrounds the cylindrical portions of the two arms 60 and 61. When the sleeve is in this position, the concave hemispherical surfaces 67 and 68 are in engagement with the spherical knob 55 and the coupling is engaged. The movement of the sleeve 75 by the spring 78 is limited by shoulders 81 and 82 provided on arms 60 and 61 respectively.

When it is desired to detach the coupler 28, all that it is necessary to do is to move sleeve 75 to the right against the action of spring 78, to the position indicated in dotted lines, whereupon arms 60 and 61 can be moved to the positions indicated by dotted lines. It is not necessary to manually move these arms outwardly as the spherical knob will act as a cam surface to force them apart as the hitch is pulled away from the automobile 26. The knob 55 similarly acts as a cam member during the coupling operation. As long as sleeve 65 is in the position shown in solid lines in Figure 3, however, these arms cannot be forced outwardly.

It is to be noted that the connection provided by coupler 28 is a universal connection providing free movement in any direction between the arms 60 and 61 and the spherical knob 55. At the same time, the coupler, by reason of the sealing plug 77, prevents any dirt from entering between the telescoping members 11 and 12.

An important feature of the present invention is the ease by which the coupling operation can be performed. As previously indicated, the inner pipe 12 which is coupled to the trailer by coupling member 14 is normally left permanently connected to the trailer. When it is desired to couple the trailer to an automobile or other motor driven vehicle, the latter is backed up to approximately the desired distance from the trailer. The pin 36 is withdrawn by pulling on the eye 37. This permits members 11 and 12 to be moved apart to extend the coupling. This extension of the two members is limited by the lug 53 engaging the left hand end of slot 52. The range is sufficient to take care of any margin of error in backing up the motor driven vehicle so that the members 11 and 12 can be extended sufficiently to bridge the distance between the trailer and the motor driven vehicle. Sleeve 75 is then withdrawn, the arms 60 and 61 being moved forwardly over the knob 55. The sleeve 75 is then allowed to spring forward under the action of spring 78. The coupler 28 is now firmly secured. All that the operator of the vehicle now has to do is to get into his vehicle and back the vehicle until the right hand end of pipe 11 engages the shoulder 14 at which time pin 36 will snap into the now aligned apertures 30 to 34. The coupler is now engaged and the operator can proceed to drive the motor driven vehicle forwardly with the assurance that the trailer is firmly secured to the vehicle. It is to be noted that there is no manipulation of the automobile or other motor driven vehicle necessary beyond the initial and absolutely necessary one of backing it up to approximately the desired position and engaging the coupler 28, then backing the vehicle up until the pin snaps into the aligned apertures and then proceeding forwardly.

In Figure 5, I have illustrated a modified form of my invention. This form is similar to the species of Figures 1 to 4 except that the outer pipe is secured to the coupling member 14 and by this coupling member to the trailer while the inner pipe is the one which is secured to the bumper 25 by means of the coupler 28. For convenience of comparison, the outer pipe is designated by the reference numeral 111 and the inner pipe by the reference numeral 112. Similarly, the internal sleeve is designated by the numeral 113 and the projections extending inwardly from pipe 111 by the numeral 109. As in the preferred species, the housing 39 for the coupler pin is located on the outer pipe 111. In this species, however, the housing 39 is secured at the forward end of the pipe 111, rather than at the rear end thereof. In order to provide a shoulder to engage the pipe 111, a collar 114 is secured to the inner pipe 112 by rivets 115 or other similar fastening means. The lug 153, corresponding to lug 53 of the preferred species is secured to the outer pipe 111 and projects inwardly into the slot 152 in the inner pipe 112. The function of the lug and the slot 152 is the same as that in the preferred species. Similarly, the function of collar 114 in limiting the movement and determining the position at which the pins will engage the apertures and also in sealing against the entrance of dust between pipes 111 and 112 is the same as that of collar 14 in the preferred species.

The arrangement of Figure 5 is somewhat simpler to the extent that it is not necessary to employ a separate inner pipe 63 in connection with the coupler 28. It will be noted that the pipe 112 extends through collar 114 and into the slidable sleeve 75. The spring 78 extends around pipe 112 in this species rather than a special pipe 63.

Both the species of Figures 1 to 4 and that of Figure 5 are alike in the features by which the access of dust to the telescoping surfaces is prevented. Similarly, both of them are alike in the ease with which the coupling operation may be effected.

In Figure 6, I have shown a connecting means for coupling the hitch to the trailer. This connecting means is adjustable to provide for connecting the hitch to different types of trailer tongues. Referring to Figure 6, it will be noted that the head 164 corresponding to head 14 is provided with two horns 165 and 166. Each of these horns is provided with a threaded socket. Eye bolts 168 and 169 are threaded into these sockets. Lock nuts 170 are provided to hold the eye bolts in their adjusted position. It will be noted from a comparison of the solid line and dotted lines showings of Figure 6 that as the eye bolts are screwed outwardly, the transverse distance between the eyes increases. Thus, by adjusting the extent to which the eye bolts extend into the threaded sockets of horns 165 and 166, the transverse distance of the eyes is varied. In this manner, it is possible to accommodate the coupling means to tongues of different width. It is to be understood that the novel connecting means of Figure 6 can be employed with either the species of Figures 1 to 6 or that of Figure 5.

It is also to be understood that the hitch of this invention is applicable in coupling any drawn vehicle to any driven vehicle. Thus, the term "trailer" as used in the specification and claims is to be construed as covering any drawn vehicle connected to any driven vehicle. In general, while I have shown certain specific embodiments for the purposes of illustration, it is to be understood that the invention is limited only by the scope of the appended claims.

What I claim as my invention is:

1. Coupling means for coupling a trailer to a motor vehicle, said coupling means comprising two telescoping members, one adapted to be connected to a motor vehicle and the other to a trailer, each of said members being closed at its outer end, a shoulder portion carried by said inner member and adapted to form a close fitting abutment for the telescoping end of said outer member, said outer and inner members being provided with apertures which are in alignment when the telescoping end of said outer member is in engagement with said shoulder portion, a pin adapted to extend through said apertures, means biasing said pin into said apertures, a housing enclosing a portion of said pin and said biasing means, and means for sealing said housing against the entrance of foreign matter when said pin is in said apertures.

2. Coupling means for coupling a trailer to a motor vehicle, said coupling means comprising two telescoping members, one adapted to be connected to a motor vehicle and the other to a trailer, each of said members being closed at its outer end, a shoulder portion carried by said inner member and adapted to form a close fitting abutment for the telescoping end of said outer member, said outer and inner members being provided with apertures which are in alignment when the telescoping end of said outer member is in engagement with said shoulder portion, a pin adapted to extend through said apertures, means biasing said pin into said apertures, a housing enclosing a portion of said pin and said biasing means, means for sealing said housing against the entrance of foreign matter when said pin is in said apertures, and means for limiting the movement of said two members apart, said limiting means comprising a slotted portion of said inner member and a portion projecting from the inner surface of said outer member into the slot of said inner member.

3. Coupling means for coupling a trailer to a motor vehicle, said coupling means comprising two telescoping cylindrical members each of uniform diameter, one adapted to be connected to a motor vehicle and the other to a trailer, each of said members being closed at its outer end, a shoulder portion carried by said inner member and adapted to form a close fitting abutment for the telescoping end of said outer member, said outer and inner members being provided with apertures which are in alignment when the telescoping end of said outer member is in engagement with said shoulder portion, a pin adapted to extend through said apertures, means biasing said pin into said apertures, a housing enclosing a portion of said pin and said biasing means, said housing having its inner end secured to said outer member in dust tight relation, means for sealing the outer end of said housing against the entrance of dust when said pin is in said apertures, and means for limiting the movement of said two members apart and maintaining the same against relative circumferential movement, said limiting means comprising a slotted portion of said inner member and a portion projecting from the inner surface of said outer member into the slot of said inner member.

4. Coupling means for coupling a trailer to a motor vehicle, said coupling means comprising two telescoping members, one adapted to be connected to a motor vehicle and the other to a trailer, each of said members being closed at its outer end, said outer and inner members being provided with apertures which are in alignment when the members are in predetermined longitudinally relative positions, a linearly reciprocable pin adapted to extend through said apertures transversely of said members, means biasing said pin into said apertures, a tubular housing enclosing a portion of said pin and said biasing means, said housing having its inner end secured to said outer member in dust tight relation, a washer secured rigidly to said pin and adapted to engage the outer end of said housing when said pin is in said apertures to seal said outer end against the entrance of dust.

5. Coupling means for coupling a trailer to a motor vehicle, said coupling means comprising two telescoping members, one adapted to be connected to a motor vehicle and the other to a trailer, each of said members being closed at its outer end, a shoulder portion carried by said inner member and adapted to form a close fitting abutment for the telescoping end of said outer member, releasable means for locking said telescoping members in relative positions in which the telescoping end of said outer member is in engagement with said shoulder portion so as to hinder the access of dust therebetween, and a dust tight housing for said locking means.

6. Coupling means for coupling a trailer to a motor vehicle, said coupling means comprising two telescoping members, one adapted to be connected to a motor vehicle and the other to a trailer, each of said members being closed at its outer end, a shoulder portion carried by said inner member and adapted to form a close fitting abutment for the telescoping end of said outer member, a collar within said outer member adjacent the telescoping end thereof to form a dustproof guide, spaced projections within said outer member at a further point to also guide said outer member, means for introducing a lubricant within said outer pipe between said guides, releasable means for locking said telescoping members in relative positions in which the telescoping end of said outer member is in engagement with said shoulder portion so as to hinder the access of dust therebetween, and a dust tight housing for said locking means.

HAROLD R. FORNEY.